UNITED STATES PATENT OFFICE.

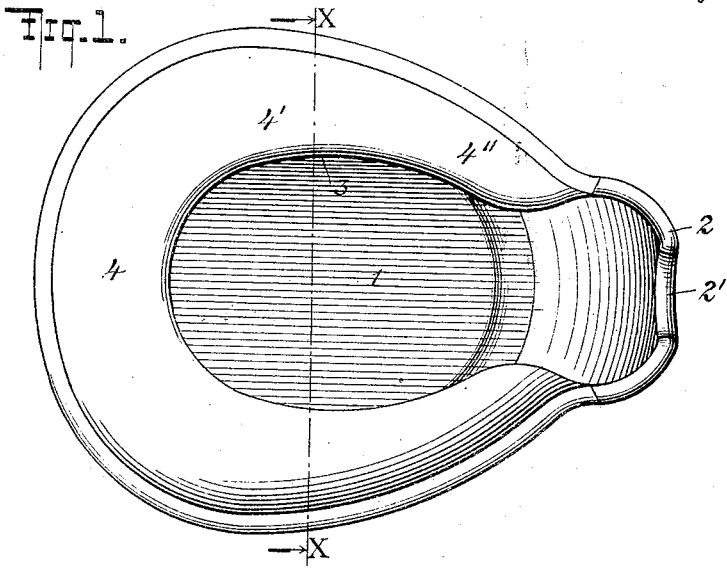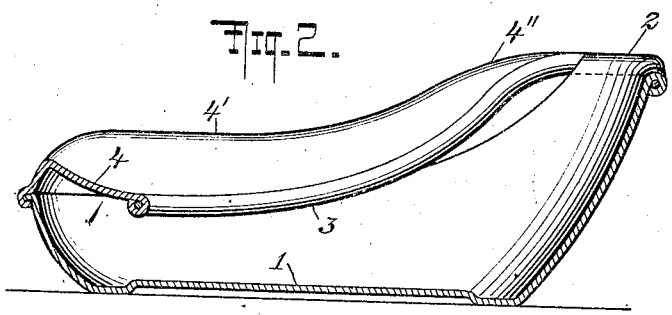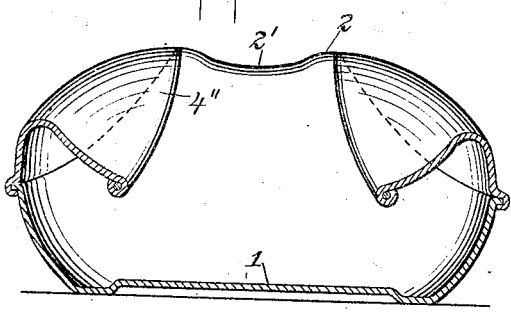

DANIEL HOGAN, OF HOBOKEN, NEW JERSEY, ASSIGNOR TO MEINECKE & COMPANY, OF NEW YORK, N. Y., A CORPORATION OF NEW JERSEY.

BED AND DOUCHE PAN.

No. 920,463.      Specification of Letters Patent.      Patented May 4, 1909.

Application filed March 2, 1908. Serial No. 418,724.

*To all whom it may concern:*

Be it known that I, DANIEL HOGAN, a citizen of the United States, residing in the city of Hoboken, county of Hudson, State of New Jersey, have invented a new and useful Improvement in Bed and Douche Pans, of which the following is a specification.

My invention relates to bed and douche pans. It is more particularly set forth in the following specification and claims, and illustrated in the annexed drawings, in which—

Figure 1 represents a plan view of the pan; Fig. 2 a longitudinal vertical section of the same; and Fig. 3 a section along the line *x—x* at Fig. 1.

In the drawing is shown a bed pan with bottom 1, and spout 2, and overhanging rim, such overhanging rim comprising a front portion 4, buttock supporting portions 4' 4', and elevated thigh supports 4" 4". The edge of such rim is designated by the figure 3. The portions 4' 4' are preferably somewhat concave, and support the buttocks of the user so as to keep the spine from pressing upon the front portion 4. This front portion 4 is preferably made somewhat concave, so as not to press against the spine or back of the user. The raised portion 4" is adapted to support the thighs of the user and to spread them so as to keep the spout clear. As the weight of the user rests principally on the portions 4' and 4", the pan is prevented from tilting and, if properly adjusted, is kept level. The spout 2 is raised substantially to or above the level of the thigh supports 4", and should be at least as high as such level and may be provided with a notch or concave depression 2'. The purpose of this elevated spout is manifold. It gives an increased capacity to the pan, prevents spilling of the contents while the pan is in use and while it is being removed from under the user, and prevents spattering of the contents in case of violent discharges or when the pan is being emptied; it also affords a convenient support for the hand of the physician or nurse, during an operation or the application of a douche or enema, and assists in protecting the top bedclothes from being soiled by holding them up away from the contents of the pan. The depression 2' provides a convenient means of preventing a sidewise slipping of the hand. It also concentrates the flow of the contents when the pan is being emptied, thus limiting the width of the stream and permitting a more convenient emptying of the pan.

The pan may be made of porcelain, zinc, enameled ware or other suitable material.

I claim:

1. In a bed pan an inwardly extending overhanging rim, provided with elevated thigh supports, and an open spout between such thigh supports, the upper edge of which spout is at least as high as the level of the thigh supports, substantially as and for the purpose described.

2. In a bed pan an inwardly extending overhanging rim, a portion of which is shaped to form elevated thigh supports, and an open spout between such thigh supports, the edge of which spout is at least as high as the level of the thigh supports, substantially as and for the purpose described.

3. In a bed pan, inwardly extending thigh supports overhanging the body of the pan, and an open spout between such thigh supports, the upper edge of which spout is at least as high as the level of the thigh supports, substantially as described.

4. In a bed pan, inwardly extending thigh supports overhanging the body of the pan, and an open spout between such thigh supports, the upper edge of which spout is at least as high as the level of the thigh supports, and is provided with a notch, substantially as described.

In testimony whereof I have hereunto set my hand in the presence of two subscribing witnesses this 27th day of February 1908.

DANIEL HOGAN.

Witnesses:
G. V. RASMUSSEN,
JOHN A. KEHLENBECK.